(12) United States Patent
Asakura et al.

(10) Patent No.: US 11,406,903 B2
(45) Date of Patent: Aug. 9, 2022

(54) INFORMATION PROCESSING DEVICE AND SCREEN GENERATION METHOD

(71) Applicant: Sony Interactive Entertainment Inc., Tokyo (JP)

(72) Inventors: You Asakura, Kanagawa (JP); Shuji Hiramatsu, Tokyo (JP); Daisuke Kawamura, San Mateo, CA (US); Wataru Kaneko, Tokyo (JP); Takashi Hatakeda, Tokyo (JP); Takeshi Nakagawa, Kanagawa (JP); Shigeru Enomoto, San Mateo, CA (US); Toru Yamamoto, San Mateo, CA (US); Satoshi Kobayashi, San Mateo, CA (US); Koichi Aoki, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/672,555

(22) Filed: Nov. 4, 2019

(65) Prior Publication Data
US 2020/0139254 A1 May 7, 2020

Related U.S. Application Data

(60) Provisional application No. 62/755,621, filed on Nov. 5, 2018.

(51) Int. Cl.
*A63F 9/24* (2006.01)
*A63F 13/00* (2014.01)
*G06F 17/00* (2019.01)
*A63F 13/795* (2014.01)
*A63F 13/335* (2014.01)
(Continued)

(52) U.S. Cl.
CPC .......... *A63F 13/795* (2014.09); *A63F 13/335* (2014.09); *A63F 13/45* (2014.09); *A63F 13/77* (2014.09); *A63F 13/87* (2014.09)

(58) Field of Classification Search
CPC ........ G07F 17/32; G07F 17/323; G07F 17/25; G07F 17/3211; A63F 2300/308; G06F 3/048
See application file for complete search history.

(56) References Cited

U.S. PATENT DOCUMENTS

2011/0212767 A1* 9/2011 Barclay ............... G07F 17/3225
463/25
2014/0128138 A1* 5/2014 Wickett .............. G07F 17/3237
463/13
(Continued)

FOREIGN PATENT DOCUMENTS

JP 2016042238 A 3/2016

*Primary Examiner* — Milap Shah
*Assistant Examiner* — Jason Pinheiro
(74) *Attorney, Agent, or Firm* — Matthew B. Dernier, Esq.

(57) ABSTRACT

An information processing device includes a receiving section configured to receive an input of a usage purpose of the information processing device from a user, an identifying section configured to identify a procedure including one or more steps necessary for realizing the usage purpose, a first screen generating section configured to generate an operating screen for completing one step in the identified procedure, and a second screen generating section configured to generate an information screen including information regarding the identified procedure.

11 Claims, 7 Drawing Sheets

(51) Int. Cl.
*A63F 13/45* (2014.01)
*A63F 13/87* (2014.01)
*A63F 13/77* (2014.01)

(56) References Cited

U.S. PATENT DOCUMENTS

2017/0209790 A1   7/2017  Nomura
2019/0188943 A1*  6/2019  Humphrey .......... G07F 17/3288

* cited by examiner

INFORMATION PROCESSING DEVICE AND SCREEN GENERATION METHOD

CROSS REFERENCE TO RELATED APPLICATIONS

This application claims the benefit of U.S. Provisional Patent Application No. 62/755,621, accorded a filing date of Nov. 5, 2018, the entire disclosure of which is hereby incorporated by reference.

BACKGROUND

The present disclosure relates to a technology that assists in realizing a purpose of a user using an information processing device.

In order to play a game by using a game device, a user opens a system screen displaying a content list, and selects a game title from the content list. On the other hand, in order to play a game together with a friend via the Internet, the user needs to go through various steps. For example, in a case of a game device provided by the present applicant, the user first starts a party application, and transmits an invitation message to a friend to invite the friend to a party room. Next, the user selects a desired game title in session play, and the friend participates in the session play, so that the user and the friend can play the game together.

SUMMARY

When a purpose of usage of the game device is to play a specific game title, it suffices for the user to select the game title from the content list, and thus the purpose can be realized relatively easily. On the other hand, complex steps are needed when a plurality of elements are involved in the usage purpose. Therefore, an unaccustomed user may not know how many steps to complete before realizing the purpose, and may thus feel annoyed. In addition, the number of steps necessary for realizing the usage purpose including the plurality of elements tends to be increased as compared with a simple usage purpose. However, when the number of steps involved before realizing the purpose can be decreased, the inconvenience of the user can be consequently reduced.

It is accordingly desirable that the present disclosure provides a technology that assists in realizing a purpose of a user using an information processing device.

According to an embodiment of the present disclosure, there is provided an information processing device including: a receiving section configured to receive an input of a usage purpose of the information processing device from a user; an identifying section configured to identify a procedure including one or more steps necessary for realizing the usage purpose; a first screen generating section configured to generate an operating screen for completing one step in the identified procedure; and a second screen generating section configured to generate an information screen including information regarding the identified procedure.

Another embodiment of the present disclosure relates to a screen generation method in an information processing device. The screen generation method includes: a step of receiving an input of a usage purpose of the information processing device from a user; a step of identifying a procedure including one or more steps necessary for realizing the usage purpose; a step of generating an operating screen for completing one step in the identified procedure; and a step of generating an information screen including information regarding the identified procedure.

It is to be noted that arbitrary combinations of the above constituent elements as well as modes obtained by converting expressions of the present disclosure between a method, a device, a system, a recording medium, a computer program, and the like are also effective as modes of the present disclosure.

According to an information processing technology in accordance with the present disclosure, it is possible to provide a technology that assists in realizing a purpose of a user using an information processing device.

DETAILED DESCRIPTION OF THE PREFERRED EMBODIMENTS

Figure 1:
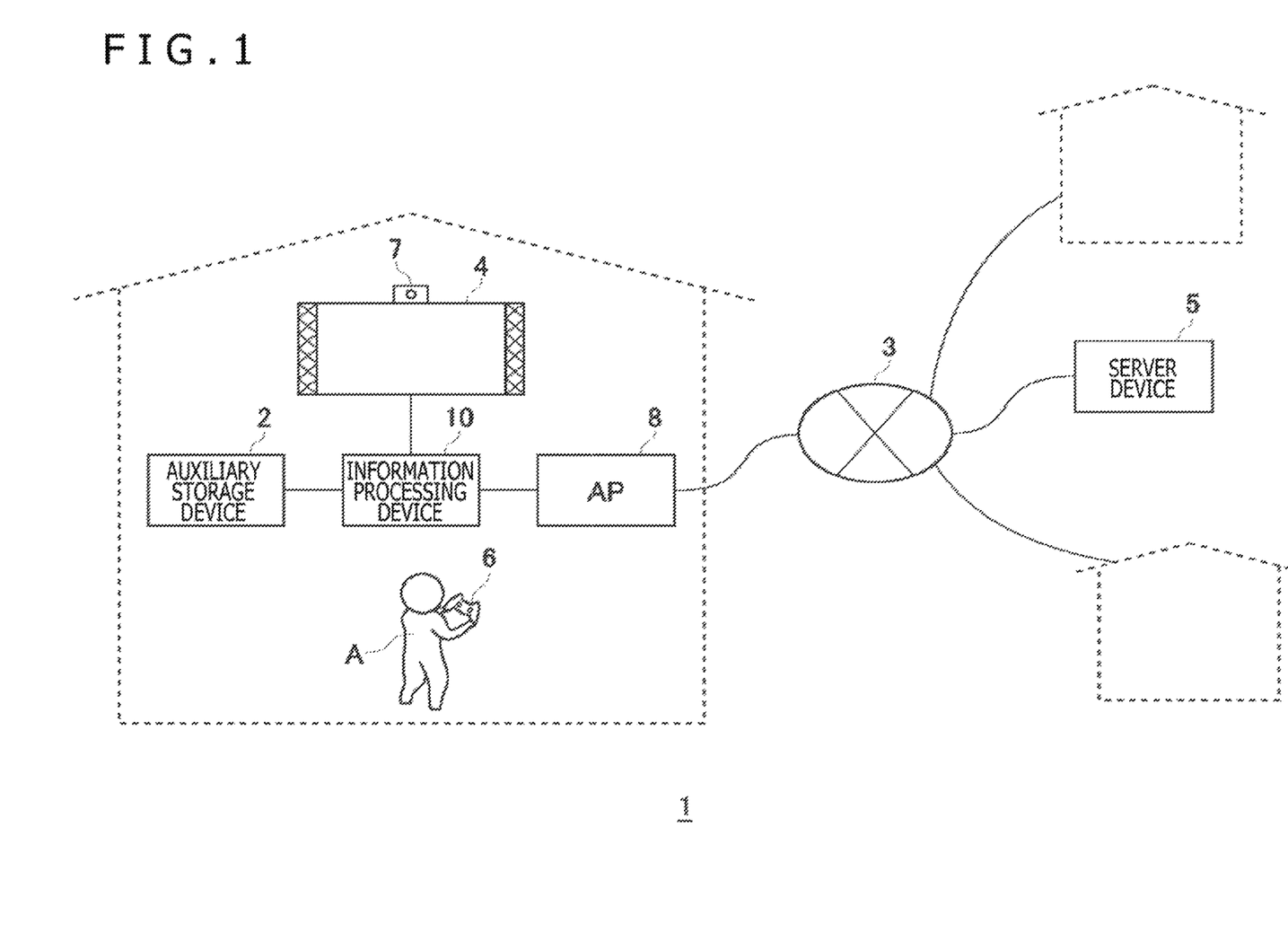
FIG. 1 is a diagram depicting an information processing system according to an embodiment.

FIG. 1 depicts an information processing system 1 according to an embodiment of the present disclosure. The information processing system 1 includes: an input device 6 for inputting user operations; an information processing device 10 that receives the user operations and executes applications or the like; and a server device 5 that provides a user with various services including a network service. An access point (hereinafter referred to as an "AP") 8 has functions of a wireless access point and a router. The information processing device 10 is connected wirelessly or by wire to the AP 8 to be communicatably connected to the server device 5 on a network 3.

An auxiliary storage device 2 is a mass storage device such as a hard disk drive (HDD), a flash memory, or the like. The auxiliary storage device 2 may be an external storage device connected to the information processing device 10 by a universal serial bus (USB) or the like, and may be an internal storage device. An output device 4 may be a television set including a display outputting an image and a speaker outputting sound, and may be a computer display. The information processing device 10 is connected wirelessly or by wire to the input device 6 operated by a user. The input device 6 transmits user operation information indicating a state of operation of an operating unit such as a button, a lever, or the like to the information processing device 10. The information processing device 10 reflects the user operation information from the input device 6 in the processing of an operating system (OS) (system software) or an application, and makes a processing result output from the output device 4.

In the information processing system 1, the information processing device 10 may be a game device that executes a game, and the input device 6 may be a device such as a game controller or the like that supplies user operation information to the information processing device 10. A camera 7 as an imaging device is disposed in the vicinity of the output device 4. The camera 7 images a space around the output device 4. The camera 7 may be a stereo camera. Though not depicted, the information processing device 10 is provided with a microphone that obtains the utterance of the user.

The server device 5 provides the network service to a plurality of users of the information processing system 1. The server device 5 manages a network account (user identification information) identifying each user. Each user signs in to the network service using the network account. When a user A signs in to the network service from the information processing device 10, the user A can register, in the server device 5, the save data of a game and a trophy as a virtual prize obtained during game play. The server device 5 retains an icon of the user A, a nickname (online identifier (ID)) thereof on the network, and profile information thereof such as a sign-in password or the like in a user database (DB) in association with the network account. The server device 5 may provide the information processing device 10 with information regarding friends of the user A or the like.

Figure 2:
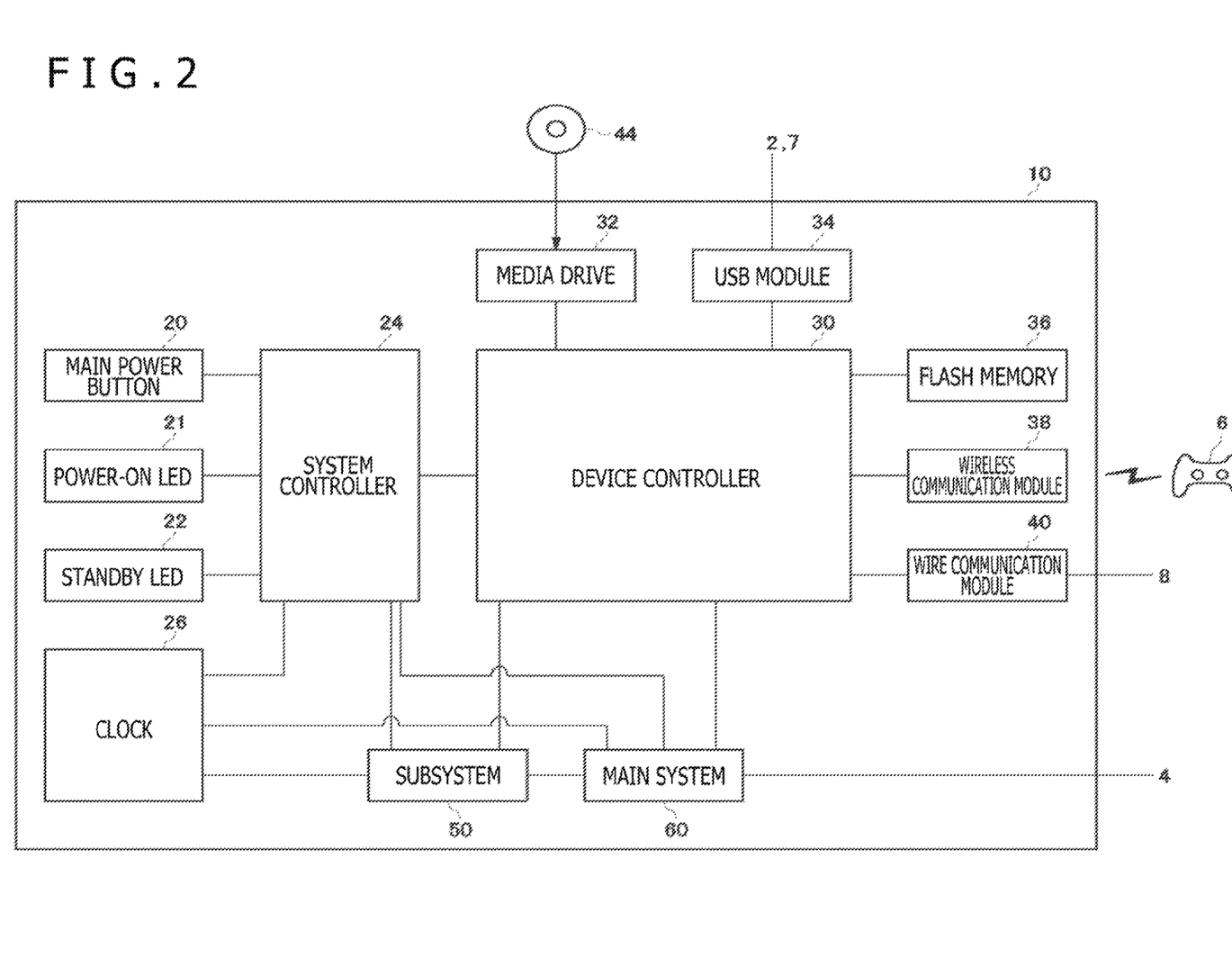
FIG. 2 is a diagram depicting a hardware configuration of an information processing device.

FIG. 2 depicts a hardware configuration of the information processing device 10. The information processing device 10 includes a main power button 20, a power-on light emitting diode (LED) 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main central processing unit (CPU), a memory as a main storage device and a memory controller, a graphics processing unit (GPU), and the like. The GPU is mainly used for arithmetic processing of a game program. These functions may be configured as a system-on-chip, and formed on one chip. The main CPU has a function of starting the OS and executing an application installed in the auxiliary storage device 2 under an environment provided by the OS.

The subsystem 50 includes a sub-CPU, a memory as a main storage device and a memory controller, and the like. The subsystem 50 does not include a GPU. The sub-CPU operates while the main CPU is in a standby state. The processing functions of the sub-CPU are limited to reduce power consumption. Incidentally, the sub-CPU and the memory may be formed on separate chips.

The main power button 20 is an input unit to which an operating input from the user is performed. The main power button 20 is provided to a front surface of a casing of the information processing device 10. The main power button 20 is operated to turn on or off the supply of power to the main system 60 of the information processing device 10. An on state of the main power supply means that the main system 60 is in an active state. An off state of the main power supply means that the main system 60 is in a standby state. The power-on LED 21 is lit when the main power button 20 is turned on. The standby LED 22 is lit when the main power button 20 is turned off.

The system controller 24 detects the depression of the main power button 20 by the user. When the main power button 20 is depressed while the main power supply is in an off state, the system controller 24 obtains the depressing operation as a "turn-on instruction." When the main power button 20 is depressed while the main power supply is in an on state, on the other hand, the system controller 24 obtains the depressing operation as a "turn-off instruction."

The main CPU has a function of executing the game program installed in the auxiliary storage device 2 or on a read only memory (ROM) medium 44, whereas the sub-CPU does not have such a function. However, the sub-CPU has a function of accessing the auxiliary storage device 2 and a function of transmitting and receiving data to and from the server device 5. The sub-CPU is configured to have only such limited processing functions, and is therefore able to operate with low power consumption as compared with the main CPU. These functions of the sub-CPU are performed when the main CPU is in a standby state. Because the subsystem 50 is operating during the standby period of the main system 60, the information processing device 10 according to the embodiment always maintains a state of being signed in to the network service provided by the server device 5.

The clock 26 is a real-time clock. The clock 26 generates present date and time information, and supplies the present date and time information to the system controller 24, the subsystem 50, and the main system 60.

The device controller 30 is configured as a large-scale integrated (LSI) circuit that transfers information between devices like a Southbridge. As depicted in the figure, the device controller 30 is connected with devices such as the system controller 24, the media drive 32, the USB module 34, the flash memory 36, the wireless communication module 38, the wire communication module 40, the subsystem 50, the main system 60, and the like. The device controller 30 accommodates differences between electrical characteristics of the respective devices and differences between data transfer rates, and controls timing of data transfer.

The media drive 32 is a drive device that is loaded with the ROM medium 44 on which application software such as a game or the like and license information are recorded, drives the ROM medium 44, and reads a program, data, and the like from the ROM medium 44. The ROM medium 44 is a read-only recording medium such as an optical disk, a magneto-optical disk, a Blu-ray Disk, or the like.

The USB module 34 is a module connected to an external device by a USB cable. The USB module 34 may be connected to the auxiliary storage device 2 and the camera 7 by a USB cable. The flash memory 36 is an auxiliary storage device constituting an internal storage. The wireless communication module 38 performs wireless communication with the input device 6, for example, under a communication protocol such as a Bluetooth (registered trademark) protocol, an IEEE 802.11 protocol, or the like. The wire communication module 40 performs wire communication with an external device. The wire communication module 40 is connected to the network 3 via the AP 8, for example.

Figure 3:
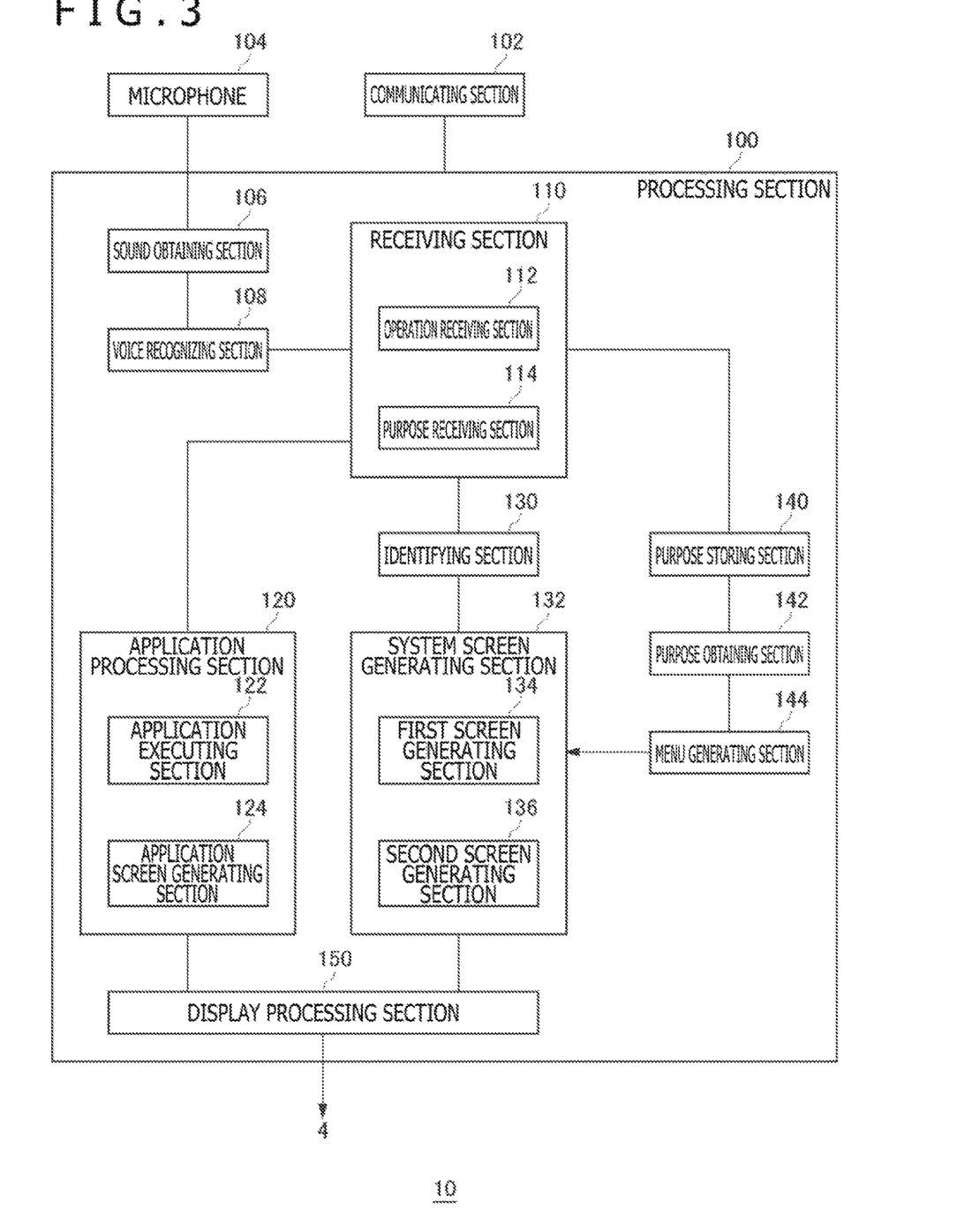
FIG. 3 is a diagram depicting functional blocks of the information processing device.

FIG. 3 depicts functional blocks of the information processing device 10. The information processing device 10 includes a processing section 100, a communicating section 102, and a microphone 104. The processing section 100 includes a sound obtaining section 106, a voice recognizing section 108, a receiving section 110, an application processing section 120, an identifying section 130, a system screen generating section 132, a purpose storing section 140, a purpose obtaining section 142, a menu generating section 144, and a display processing section 150. The application processing section 120 includes an application executing section 122 and an application screen generating section 124.

The elements described as functional blocks performing various processing in FIG. 3 can be configured by a circuit block, a memory, or another LSI in terms of hardware, and are implemented by a program loaded in a memory or the like in terms of software. Hence, it is to be understood by those skilled in the art that these functional blocks can be implemented in various forms by only hardware, only software, or combinations of hardware and software, and are not limited to one of the forms.

The communicating section 102 is represented as a configuration combining the functions of the wireless communication module 38 and the wire communication module 40 depicted in FIG. 2. The communicating section 102 receives operation information of the input device 6, and is communicatably connected to the server device 5. The receiving section 110 includes an operation receiving section 112 and a purpose receiving section 114. The operation receiving section 112 receives operation information of the input device 6 via the communicating section 102. The purpose receiving section 114 according to the embodiment receives an input of a purpose of usage of the information processing device 10 from the user A. The purpose receiving section 114 may receive the input of the usage purpose on the basis of uttered voice of the user A.

In the information processing system 1, the user A inputs a usage purpose to the information processing device 10 when using the information processing device 10. When the information processing device 10 receives the usage purpose, the information processing device 10 performs processing that smooths a process up to realization of the usage purpose. When the user A intends to play a specific game title (for example, a title "ABC Tennis"), for example, the user A utters "I want to play ABC Tennis." The purpose of usage of the information processing device 10 by the user A at this time is to "play ABC Tennis." The information processing device 10 according to the embodiment recognizes the usage purpose of the user by using a natural language understanding function, and thereafter identifies a procedure for realizing the usage purpose. The information processing device 10 smooths a process up to realization of the usage purpose by indicating information regarding the procedure to the user A.

First Embodiment

When the user A makes an utterance, the uttered voice is input to the microphone 104, and the sound obtaining section 106 obtains user voice data. The voice recognizing section 108 converts the user voice data into text data by performing voice recognition of the user voice data, and passes the text data to the purpose receiving section 114. The purpose receiving section 114 has a natural language understanding function, and understands an intention of the user from the text data.

In a case where the user A makes an utterance "I want to play ABC Tennis," the purpose receiving section 114 receives a purpose of the user A which is to "play ABC Tennis" from the sentence converted into text by the voice recognizing section 108. The received usage purpose is supplied to the identifying section 130.

The identifying section 130 identifies a procedure including one or more steps necessary for realizing the usage purpose. In the embodiment, one step means a step of performing input on one operating screen by the user. The identifying section 130 identifies steps necessary for realizing the purpose of "playing ABC Tennis" as follows.

(1a) Open a home screen for selecting a game icon.
(1b) Select an icon of "ABC Tennis."

The auxiliary storage device 2 may store, for each usage purpose, a series of steps necessary for realizing the usage purpose. For example, the auxiliary storage device 2 stores, as a necessary step for the purpose of "playing a game," (a) opening the home screen for selecting a game icon. In addition, the auxiliary storage device 2 stores, as necessary steps for a purpose of "playing a (specific) game," (a) opening the home screen for selecting a game icon, and (b) selecting a (specific) game icon displayed on the home screen.

In a first embodiment, the identifying section 130 determines that the purpose of "playing ABC Tennis" belongs to the purpose of "playing a specific game." Hence, the identifying section 130 identifies, as concrete steps, (1a) opening the home screen and (1b) selecting the icon of "ABC Tennis" which icon is displayed on the home screen.

The identifying section 130 extracts steps in which input of the user A is requested from the steps included in the identified procedure. Conversely, the identifying section 130 extracts steps in which input of the user A is necessary by identifying and deleting steps that can be omitted from the steps included in the identified procedure. In the first embodiment, the identifying section 130 identifies the step (1a) as a step that can be omitted, and extracts the step (1b) as a step in which input of the user A is requested.

Whether or not input of the user is requested in a step may be determined by a criterion of whether or not a selection of the user is needed in the step. For example, in a case where "ABC Tennis" is not installed on the information processing device 10, the information processing device 10 needs to purchase and download "ABC Tennis" from an external content server in order that the user can play "ABC Tennis." This purchase processing necessitates a selection of the user. Thus, a step of determining whether or not to make a purchase is a step in which input of the user is requested.

In addition, whether or not input of the user is requested in a step may be determined by a criterion of whether or not a confirmation of the user is needed in the step. In the above-described example, the step (1b) identified by the identifying section 130 may be omitted, and automatically performed by the application executing section 122. In that case, the whole of the steps (1a) and (1b) is omitted, and therefore ABC Tennis is automatically started when the user A makes the utterance "I want to play ABC Tennis."

However, voice recognition processing may not be said to be perfect. It is therefore undesirable to automatically start a game title different from the usage purpose of the user A due to a recognition error or the like. Accordingly, in the first embodiment, the identifying section 130 extracts the step (1b) as a step in which input of the user A is requested in order to make the user A confirm the game title. Incidentally, in a case where a degree of accuracy of voice recognition processing is derived, whether or not to automatically start the game title may be determined according to the derived degree of accuracy.

The system screen generating section 132 includes a first screen generating section 134 and a second screen generating section 136. The first screen generating section 134 generates an operating screen for completing one step in the procedure identified by the identifying section 130. The second screen generating section 136 generates an information screen including information regarding the procedure identified by the identifying section 130. Incidentally, the second screen generating section 136 preferably generates the information screen including information regarding the step extracted by the identifying section 130 as the information regarding the identified procedure. The display processing section 150 displays, on the output device 4, a system screen including the operating screen generated by the first screen generating section 134 and the information screen generated by the second screen generating section 136.

Figure 4:
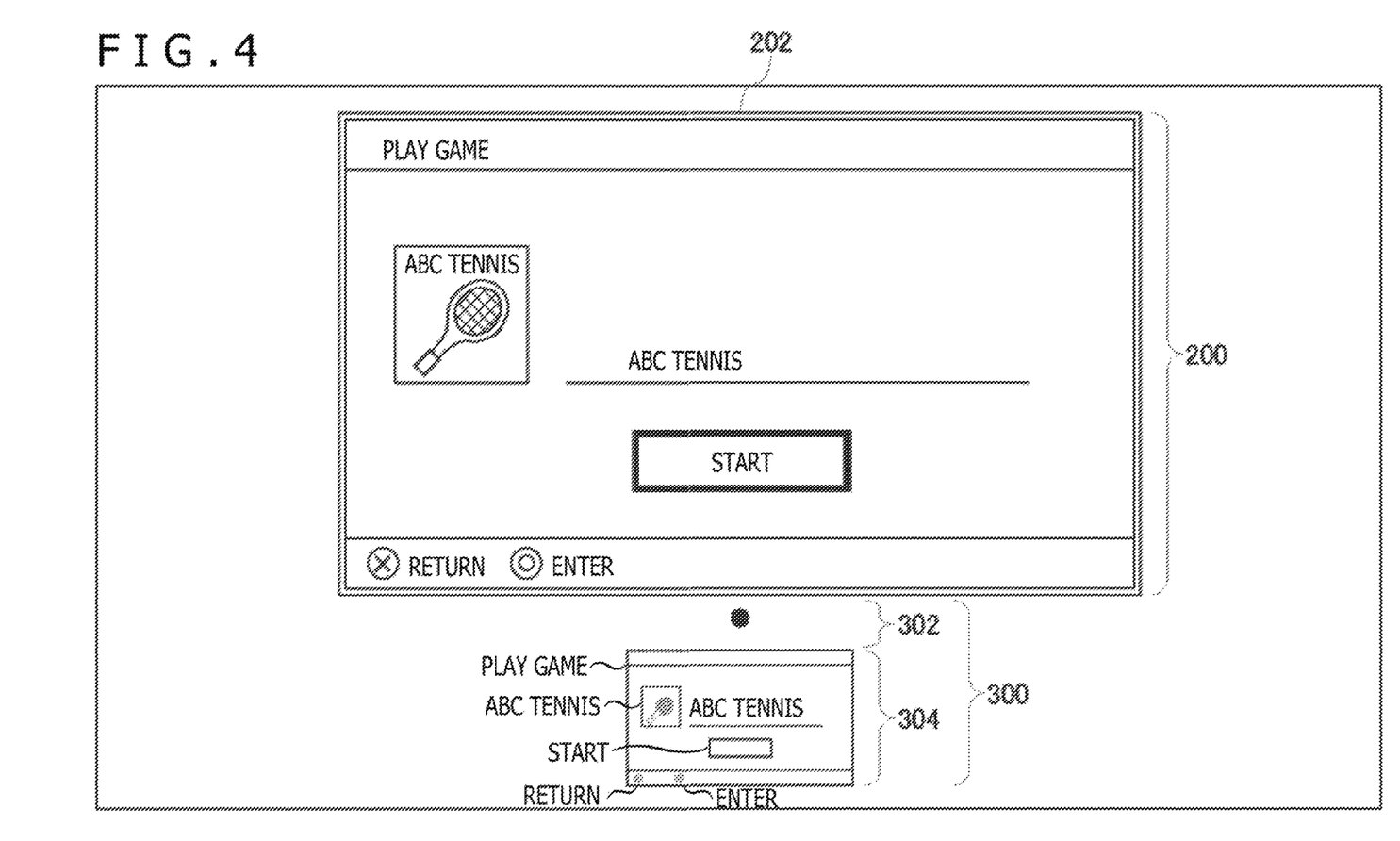
FIG. 4 is a diagram depicting an example of a system screen.

FIG. 4 depicts an example of the system screen generated by the system screen generating section 132. The system screen is divided into an operating region 200 displaying the operating screen 202 on which input is performed by the user and an information region 300 displaying the information screen including the information regarding the procedure. The first screen generating section 134 generates the operating screen 202 included in the operating region 200. The second screen generating section 136 generates the information screen included in the information region 300. The user can operate the GUI of the operating screen 202, but cannot operate the information displayed in the information region 300.

On the operating screen 202 depicted in FIG. 4, the user A can start "ABC Tennis" by depressing an Enter button of the input device 6. Incidentally, in the system disclosed in Japanese Patent Laid-Open No. 2016-42238, the user A needs to find and select the icon of "ABC Tennis" from a content list. In the embodiment, the first screen generating section 134 generates the operating screen 202 in a state in which "ABC Tennis" is already selected, and the user A can start "ABC Tennis" by merely depressing the Enter button of the input device 6.

The second screen generating section 136 generates the information screen including information indicating the total number of operating screens displayed before realization of the usage purpose of the user A. The information indicating the total number of operating screens is displayed in a step number display region 302. In addition, the second screen generating section 136 generates the information screen including information indicating an outline of each operating screen. The information indicating the outline of each operating screen is displayed in a step outline display region 304. The information region 300 is thus divided into the step number display region 302 for displaying the information indicating the total number of operating screens displayed before realization of the usage purpose and the step outline display region 304 for displaying the information indicating the outline of each operating screen.

The second screen generating section 136 may express the total number of operating screens by the number of circular marks. In the first embodiment, for the usage purpose of the user A, only one step (1b) is extracted as a step in which input of the user A is requested. Hence, the step number display region 302 displays one circular mark to represent that the total number of operating screens displayed is one. Incidentally, a filled-in circular mark indicates that the operating screen 202 corresponding to the mark is displayed in the operating region 200. Incidentally, the second screen generating section 136 may express the total number of operating screens and the ordinal page number of the operating screen being displayed in the form of a fraction (ordinal number of operating screen being displayed)/(total number). In any case, the second screen generating section 136 preferably presents, to the user, information indicating the total number of operating screens and the ordinal page number of the screen being displayed.

The second screen generating section 136 may generate the information indicating the outline of the operating screen as a step outline image corresponding to the operating screen. The step outline image may be a thumbnail image of the operating screen, or may be an image including text describing the outline of the step.

When the user A depresses the Enter button of the input device 6 on the operating screen 202, the application executing section 122 starts "ABC Tennis," and the application screen generating section 124 generates a game screen. The user A can consequently play ABC Tennis.

As described above, the user A can recognize the total number of operating screens to be operated from the number of marks displayed in the step number display region 302 on the system screen depicted in FIG. 4. The user A can thereby check the number of steps before realizing the usage purpose. In addition, the user A can check general steps before realizing the usage purpose from step outline images displayed in the step outline display region 304.

In addition, the identifying section 130 identifies the step (1a) as a step that can be omitted, and does not include the step (1a) in the operating screen presented to the user A. The user A can therefore realize the usage purpose with the small number of steps. It is desirable to make the usage purpose realized efficiently by thus omitting the step of the user.

Second Embodiment

In a second embodiment, the user A makes an utterance "I want to play ABC Tennis with friend B." The uttered voice is input to the microphone 104, and the sound obtaining section 106 obtains user voice data. The voice recognizing section 108 converts the user voice data into text by performing voice recognition of the user voice data, and passes the text to the purpose receiving section 114. The purpose receiving section 114 understands an intention of the user from the text by a natural language understanding function, and thereby receives an input of the usage purpose of the information processing device 10 of the user A.

In the case where the user A makes the utterance "I want to play ABC Tennis with friend B," the purpose receiving section 114 receives a purpose of the user A which is to "play ABC Tennis with friend B" from the sentence converted into text by the voice recognizing section 108. The received usage purpose is supplied to the identifying section 130.

The identifying section 130 identifies a procedure including one or more steps necessary for realizing the usage purpose. The identifying section 130 identifies steps necessary for realizing the purpose of "playing ABC tennis with friend B" as follows.

(2a) Open the home screen.
(2b) Select an icon of a "party application" from a content list.
(2c) Create a party by inputting necessary items on a party creating screen.
(2d) Invite the friend B to the created party.
(2e) Select the icon of "ABC Tennis" in session play.

For the purpose of "playing a (specific) game with a (specific) friend," the auxiliary storage device 2 stores, as necessary steps, (a) opening the home screen, (b) selecting the icon of the "party application" from the content list, (c) creating a party by inputting necessary items on the party creating screen, (d) inviting the specific friend to the created party, and (e) selecting the icon of the specific game in session play.

In the second embodiment, the identifying section 130 determines that the purpose of "playing ABC Tennis with friend B" belongs to the purpose of "playing a (specific) game with a (specific) friend." Hence, the identifying section 130 identifies the above-described steps (2a) to (2e) as concrete steps.

Incidentally, in order that the user A and the friend B can play ABC Tennis together, the friend B needs to join the session of "ABC Tennis" himself/herself after the step (2e). In order to facilitate the joining of the session of "ABC Tennis" by the friend B, the user A can invite the friend B to the session of "ABC Tennis." However, this inviting step is not included in the second embodiment.

The identifying section 130 extracts steps in which input of the user A is requested from the steps included in the identified procedure. In the second embodiment, the identifying section 130 identifies the steps (2a) and (2b) as steps that can be omitted, and extracts the steps (2c), (2d), and (2e) as steps in which input of the user A is requested. In terms of the criteria described in the first embodiment, the identifying section 130 extracts the step (2c) as a step in which a selection of the user A is needed, and extracts the steps (2d) and (2e) as steps in which confirmation of the user A is needed.

The first screen generating section 134 generates an operating screen for completing one step in the procedure identified by the identifying section 130. The second screen generating section 136 generates an information screen including information regarding the procedure identified by the identifying section 130. The display processing section 150 displays, on the output device 4, a system screen including the operating screen generated by the first screen generating section 134 and the information screen generated by the second screen generating section 136.

Figure 5:
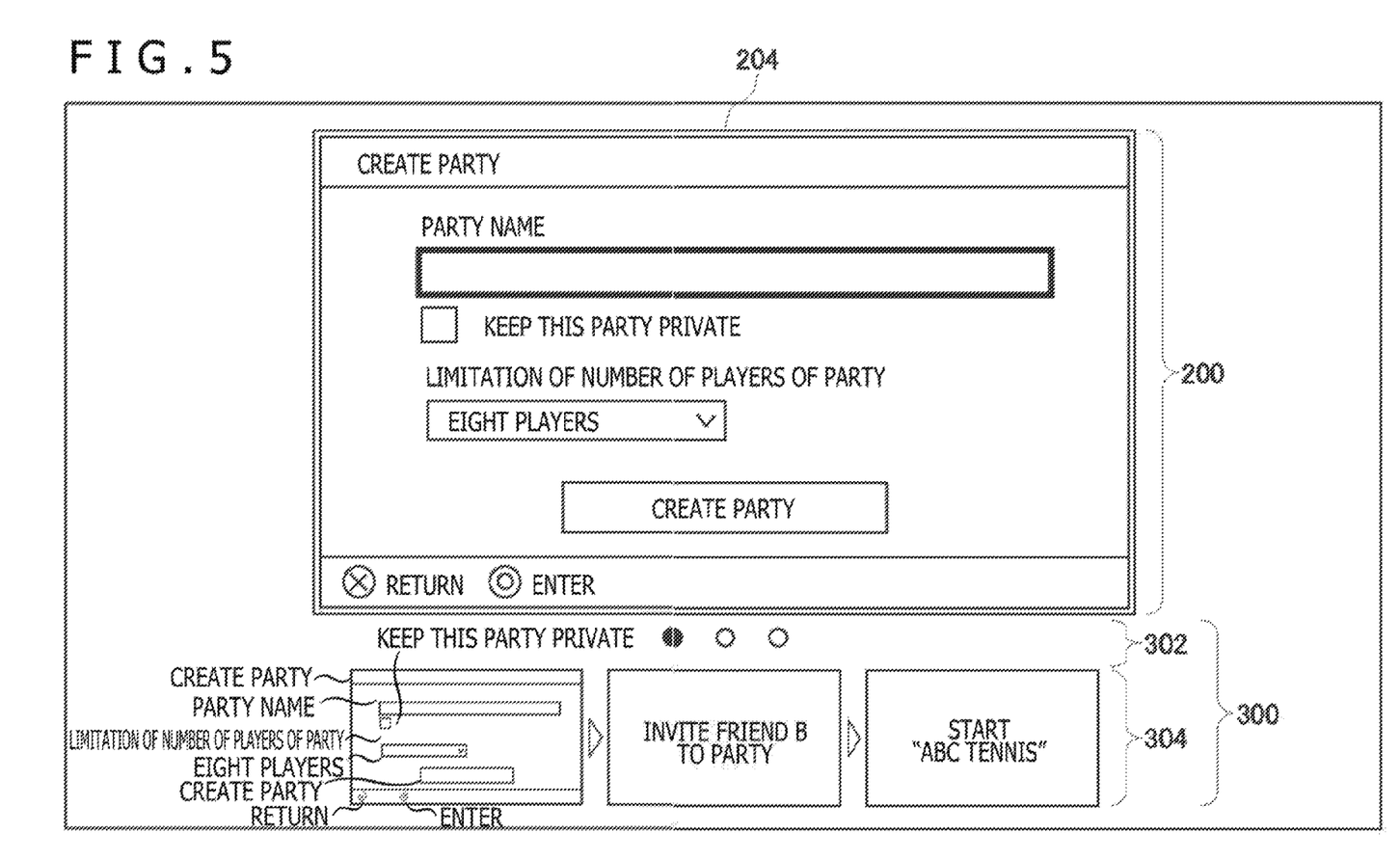
FIG. 5 is a diagram depicting another example of the system screen.

FIG. 5 depicts another example of the system screen generated by the system screen generating section 132. The system screen is divided into an operating region 200 displaying the operating screen 204 on which input is performed by the user and an information region 300 displaying the information screen including the information regarding the procedure. The first screen generating section 134 generates the operating screen 202 included in the operating region 200. The second screen generating section 136 generates the information screen included in the information region 300. On the operating screen 204 depicted in FIG. 5, the user A inputs necessary items for party creation by using the input device 6.

In the second embodiment, for the usage purpose of the user A, three steps (2c), (2d), and (2e) are extracted as steps in which input of the user A is requested. Hence, the step number display region 302 displays three circular marks to represent that the total number of operating screens displayed is three. Incidentally, a filled-in circular mark indicates that the operating screen 204 corresponding to the mark is displayed in the operating region 200.

The second screen generating section 136 arranges the circular marks corresponding in number to the total number of operating screens in the step number display region 302 from the left in order according to display order of the operating screens. Hence, the mark disposed in a leftmost position corresponds to the operating screen of the step (2c) displayed first, the mark disposed in a second position from the left corresponds to the operating screen of the step (2d) displayed second, and the mark disposed in a third (rightmost) position from the left corresponds to the operating screen of the step (2e) displayed third.

The second screen generating section 136 fills in the mark corresponding to the operating screen 204 being displayed, and thus makes the display mode of the mark different from that of the other marks. The second screen generating section 136 thereby expresses information indicating the number of remaining operating screens to be displayed before realization of the usage purpose. That is, on the system screen depicted in FIG. 5, the user A can recognize that the usage purpose can be realized by operating two more operating screens in addition to the operating screen 204 being displayed.

The second screen generating section 136 generates step outline images corresponding in number to the total number of operating screens. The step outline images may be thumbnail images of the operating screens, but may be images including text describing outlines of the steps. On the system screen depicted in FIG. 5, a thumbnail image of the already displayed operating screen 204 is displayed in the step outline display region 304, and the step outline images of the operating screens not yet displayed are displayed so as to include text describing outlines of the steps. In the step outline display region 304, the step outline images cannot be displayed large. Thus, the second screen generating section 136 expresses the outlines of the steps by text, thereby making it easy for the user A to recognize the outlines of the steps.

When the user A operates the last operating screen, the application executing section 122 starts "ABC Tennis," and the application screen generating section 124 generates a game screen. The user A can thereby play ABC Tennis.

As described above, the user A can recognize the total number of operating screens to be operated from the number of marks displayed in the step number display region 302 on the system screen depicted in FIG. 5. The user A can thereby check the number of steps before realizing the usage purpose. In addition, the user A can check general steps before realizing the usage purpose from the step outline images displayed in the step outline display region 304.

In addition, the identifying section 130 identifies the steps (2a) and (2b) as steps that can be omitted, and does not include the steps (2a) and (2b) in the operating screens presented to the user A. The user A can therefore realize the usage purpose in the smaller number of steps. It is desirable to make the usage purpose realized efficiently by thus omitting the steps of the user.

Third Embodiment

Also in a third embodiment, as in the second embodiment, the user A makes an utterance "I want to play ABC Tennis with friend B." The uttered voice is input to the microphone 104, and the sound obtaining section 106 obtains user voice data. The voice recognizing section 108 converts the user voice data into text by performing voice recognition of the user voice data, and passes the text to the purpose receiving section 114. The purpose receiving section 114 understands an intention of the user from the text by a natural language understanding function, and thereby receives an input of the usage purpose of the information processing device 10.

In the case where the user A makes the utterance "I want to play ABC Tennis with friend B," the purpose receiving section 114 receives a purpose of the user A which is to "play ABC Tennis with the friend B" from the sentence converted into text by the voice recognizing section 108. The received usage purpose is supplied to the identifying section 130.

As a difference from the second embodiment, in the third embodiment, ABC Tennis is not installed in the information processing device 10. The user A therefore needs to download ABC Tennis from an external content server in order to play ABC Tennis with the friend B.

The identifying section 130 identifies a procedure including one or more steps necessary for realizing the usage purpose. The identifying section 130 identifies steps necessary for realizing the purpose of "playing ABC Tennis with friend B" as follows.

(3a) Notify that "ABC" tennis needs to be purchased.

(3b) Connect to the content server.

(3c) Select "ABC Tennis" from a content list of the content server.

(3d) Operate a purchase button, and download "ABC Tennis."

(3e) Open the home screen.

(3f) Select the icon of the "party application" from the content list.

(3g) Create a party by inputting necessary items on the party creating screen.

(3h) Invite the friend B to the created party.

(3i) Select the icon of "ABC Tennis" in session play.

The identifying section 130 extracts steps in which input of the user A is requested from the steps included in the identified procedure. In the second embodiment, the identifying section 130 identifies the steps (3b), (3c), (3e), and (3f) as steps that can be omitted, and extracts the steps (3a), (3d), (3g), (3h), and (3i) as steps in which input of the user A is requested. In terms of the criteria described in the first embodiment, the identifying section 130 extracts the steps (3a), (3d), and (3g) as steps in which a selection of the user A is needed, and extracts the steps (3h) and (3i) as steps in which confirmation of the user A is needed. Incidentally, the steps (3a) and (3d) may be extracted as steps in which confirmation of the user A is needed.

The first screen generating section 134 generates an operating screen for completing one step in the procedure identified by the identifying section 130. The second screen generating section 136 generates an information screen including information regarding the procedure identified by the identifying section 130. The display processing section 150 displays, on the output device 4, a system screen including the operating screen generated by the first screen generating section 134 and the information screen generated by the second screen generating section 136.

Figure 6:
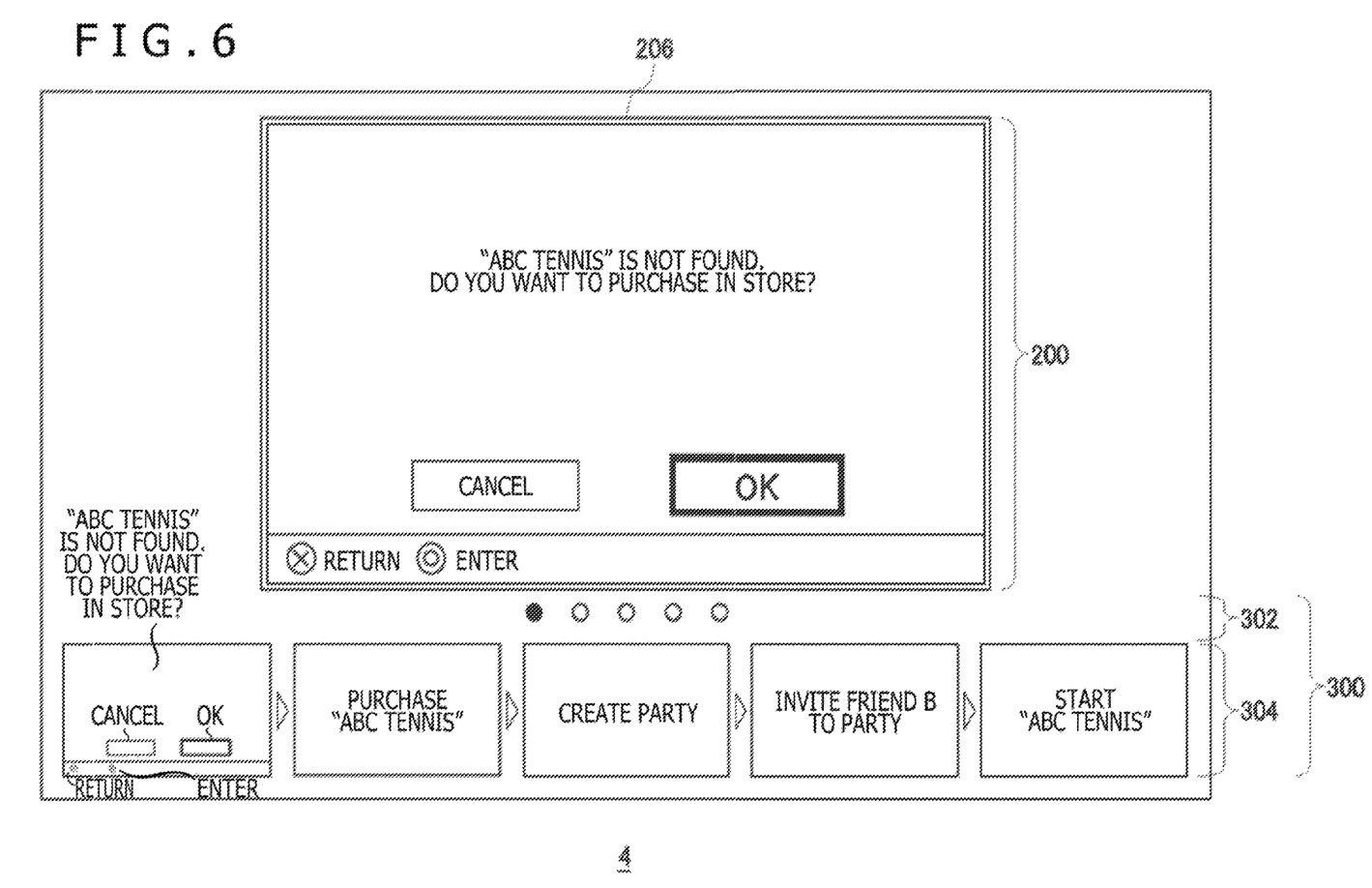
FIG. 6 is a diagram depicting still another example of the system screen.

FIG. 6 depicts still another example of the system screen generated by the system screen generating section 132. The system screen is divided into an operating region 200 displaying the operating screen 206 on which input is performed by the user and an information region 300 displaying the information screen including the information regarding the procedure. The first screen generating section 134 generates the operating screen 202 included in the operating region 200. The second screen generating section 136 generates the information screen included in the information region 300. On the operating screen 206 depicted in FIG. 6, the user A makes a selection as to whether or not to purchase "ABC Tennis" in a store (content server) by using the input device 6.

Incidentally, the identifying section 130 identifies the procedure necessary for realizing the usage purpose of "playing ABC Tennis with friend B" on an assumption that the user A purchases "ABC Tennis" from the content server in the step (3a). Here, if the user A has the ROM medium 44 of "ABC Tennis," the user A does not need to make the purchase from the content server, but inserts the ROM medium 44 into the media drive 32 and installs "ABC Tennis." In this timing, the identifying section 130 may discard the already identified procedure, and identify a procedure necessary for realizing the usage purpose again in a state in which "ABC Tennis" is installed.

In the third embodiment, for the usage purpose of the user A, five steps (3a), (3d), (3g), (3h), and (3i) are extracted as steps in which input of the user A is requested. Hence, the step number display region 302 displays five circular marks to represent that the total number of operating screens displayed is five. Incidentally, a filled-in circular mark indicates that the operating screen 206 corresponding to the mark is displayed in the operating region 200.

The second screen generating section 136 arranges the circular marks corresponding in number to the total number of operating screens in the step number display region 302 from the left in order according to the display order of the operating screens. Hence, the mark disposed in a leftmost position corresponds to the operating screen of the step (3a) displayed first, the mark disposed in a second position from the left corresponds to the operating screen of the step (3d) displayed second, the mark disposed in a third position from the left corresponds to the operating screen of the step (3g) displayed third, the mark disposed in a fourth position from the left corresponds to the operating screen of the step (3h) displayed fourth, and the mark disposed in a fifth (rightmost) position from the left corresponds to the operating screen of the step (3i) displayed fifth.

The second screen generating section 136 fills in the mark corresponding to the operating screen 206 being displayed, and thus makes the display mode of the mark different from that of the other marks. The second screen generating section 136 thereby expresses information indicating the number of remaining operating screens to be displayed before realization of the usage purpose. That is, on the system screen depicted in FIG. 6, the user A can recognize that the usage purpose can be realized by operating four more operating screens in addition to the operating screen 206 being displayed.

The second screen generating section 136 generates step outline images corresponding in number to the total number of operating screens. The step outline images may be thumbnail images of the operating screens, but may be images including text describing outlines of the steps.

As described above, the user A can recognize the total number of operating screens to be operated from the number of marks displayed in the step number display region 302 on the system screen depicted in FIG. 6. The user A can thereby check the number of steps before realizing the usage purpose. In addition, the user A can check general steps before realizing the usage purpose from the step outline images displayed in the step outline display region 304.

In addition, the identifying section 130 identifies the steps (3b), (3c), (3e), and (3f) as steps that can be omitted, and does not include the steps (3b), (3c), (3e), and (3f) in the operating screens presented to the user A. The user A can therefore realize the usage purpose in a smaller number of steps. It is desirable to make the usage purpose realized efficiently by thus omitting the steps of the user.

In the first to third embodiments, when the identifying section 130 is supplied with a usage purpose from the purpose receiving section 114, the identifying section 130 may analyze and derive a procedure for realizing the usage purpose. However, as described above, procedures for realizing usage purposes may be derived and stored in the auxiliary storage device 2 for the respective usage purposes in advance. In this case, a table associating the usage purposes with the procedures may be stored in the auxiliary storage device 2, and the identifying section 130 may identify a procedure by referring to the table.

In addition, in a case where there is an operating screen including a plurality of options, the identifying section 130 identifies steps following the operating screen on an assumption that one of the options is selected. In a case where a game moving image is distributed, for example, and a distributing server to be used can be selected from among a plurality of options, the identifying section 130 may identify a procedure for realizing a usage purpose on an assumption that a distributing server with a highest usage frequency thus far is selected. Incidentally, when the user performs an input not complying with the procedure on the operating screen, the identifying section 130 identifies a procedure following the operating screen again. Specifically, when the distributing server with the highest usage frequency is not selected on a distributing server selecting screen, it suffices for the identifying section 130 to identify a procedure following the operating screen again at that point in time.

Incidentally, in a case where the user A makes an utterance "I want to play a game with friend B," the game that the user A desires to play with the friend B is not identified from the content of the utterance. In this case, the identifying section 130 may identify a game title that the user A and the friend B have played together most recently, and identify a procedure necessary to play the game with the friend B. Incidentally, when the user A does not agree to play the game title on an operating screen for confirming the game to be played, an operating screen for selecting another game title may be presented, and steps following the operating screen may be identified again.

In the first to third embodiments, when there is another operating screen displayed temporally before or after the operating screen displayed in the operating region 200, the first screen generating section 134 may display a part of the another operating screen at a left or right edge portion of the screen. When a part of the operating screen of another step is displayed on a left side and/or a right side of the operating screen being operated, the user A can recognize the presence of the another operating screen before or after the operating screen being operated.

In addition, in the first to third embodiments, the user A inputs a usage purpose to the information processing device 10 by utterance. However, a usage purpose may be input by operating the input device 6.

Fourth Embodiment

As described in the first to third embodiments, when the information processing device 10 according to the embodiments receives an input of a usage purpose of the user A, the information processing device 10 generates an information screen assisting in the realization of the purpose of the user. In a fourth embodiment, the information processing device 10 collects input usage purposes, and registers a usage purpose with a high input frequency as a menu item so that the user A can select the usage purpose on the system screen. The provision of the menu item related to the usage purpose enables the user A to realize the usage purpose easily because a necessary procedure is identified automatically when the user A selects the menu item.

The purpose storing section 140 stores usage purposes received by the purpose receiving section 114. The purpose storing section 140 may, for example, be a storage area of the auxiliary storage device 2. The purpose storing section 140 collects and stores the usage purposes of the user A. The purpose obtaining section 142 refers to the purpose storing section 140, and obtains the usage purposes of the user A. The processing of obtaining the usage purposes may be performed once a month, for example.

The purpose obtaining section 142 performs statistical processing on the usage purposes of the user A, and identifies a usage purpose input with a high frequency. Whether the usage purpose is input with a high frequency may be evaluated on the basis of a relative input ratio between usage purposes, or may be determined on the basis of whether the number of times of input of the same usage purpose exceeds a number of times as a threshold value in a predetermined period. For example, a usage purpose input more than three times in a period of one month may be identified as a usage purpose input with a high frequency.

The menu generating section 144 generates menu items related to the usage purpose obtained by the purpose obtaining section 142. The operating screen generated by the first screen generating section 134 has a function of being able to display a menu list according to a predetermined operation on an icon. For example, when a predetermined button operation is performed on an icon image of contents displayed in the content list, menu items related to the contents are displayed in a list. Similarly, when a predetermined button operation is performed on an icon image of a friend displayed in a friend list, menu items related to the friend are displayed in a list. The first screen generating section 134 may display, in a state of being included in the lists, the menu items related to the usage purpose which menu items are generated by the menu generating section 144.

Figure 7A:
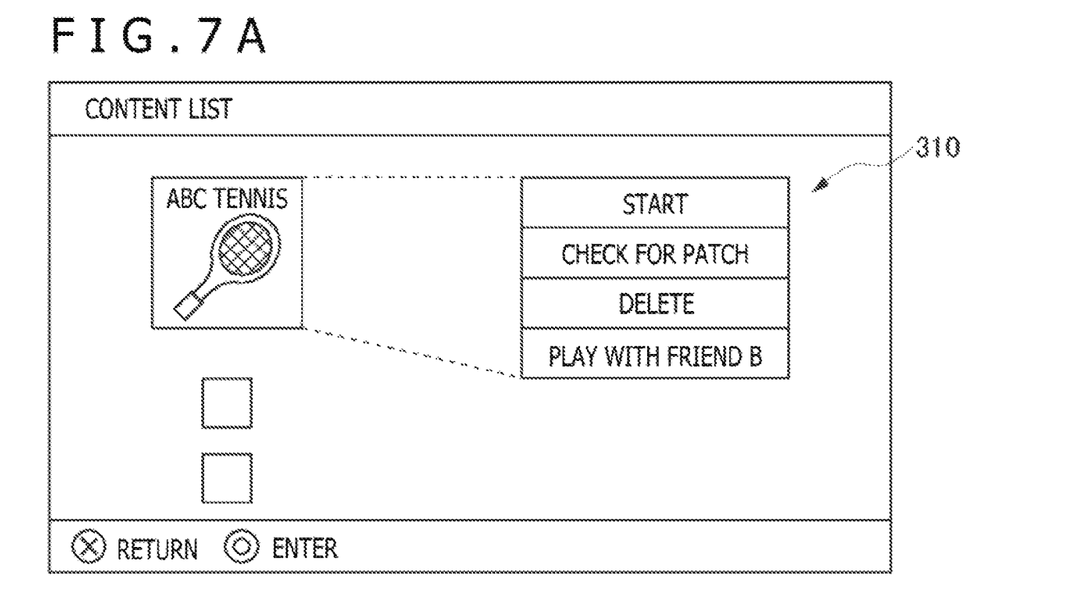
FIGS. 7A and 7B are diagrams depicting an example of a menu list.

FIG. 7A depicts an example of a menu list 310 associated with a content icon of the content list. In the present example, a menu item "play with friend B" is displayed in association with the icon of "ABC Tennis." When the user A selects the item "play with friend B," the operation receiving section 112 receives the operation of selecting the menu item. The selecting operation received by the operation receiving section 112 may be converted into a usage purpose of "playing ABC Tennis with friend B," and the usage purpose may be supplied to the identifying section 130. The identifying section 130 accordingly identifies a procedure including one or more steps necessary for realizing the usage purpose associated with the menu item. Subsequent processing is as described in the second and third embodiments.

Figure 7B:
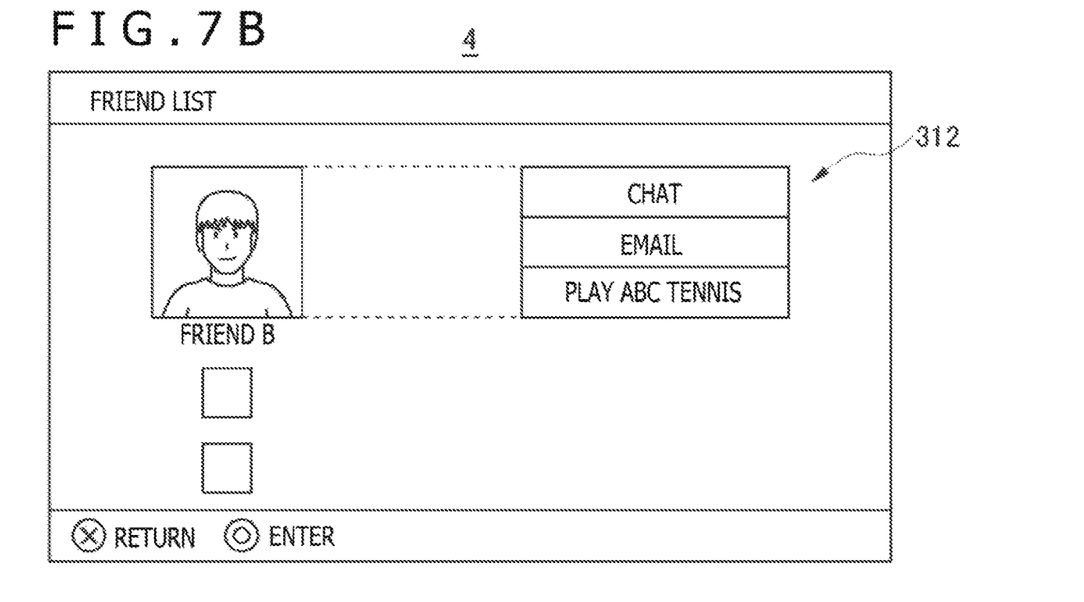

FIG. 7B depicts an example of a menu list 312 associated with a friend icon in a friend list. In the present example, a menu item "play ABC Tennis" is displayed in association with an icon of the "friend B." When the user A selects an item "play with friend B," the operation receiving section 112 receives the operation of selecting the menu item. The selecting operation received by the operation receiving section 112 may be converted into a usage purpose of "playing ABC Tennis with friend B," and the usage purpose may be supplied to the identifying section 130. The identifying section 130 accordingly identifies a procedure including one or more steps necessary for realizing the usage purpose associated with the menu item. Subsequent processing is as described in the second and third embodiments.

The menu generating section 144 extracts a plurality of elements from the usage purpose of "playing ABC Tennis with friend B." Here, "ABC Tennis," "friend B," and "play" are extracted as elements. The menu generating section 144 generates the menu item combining "friend B" and "play" for "ABC Tennis." In addition, the menu generating section 144 generates the menu item combining "ABC Tennis" and "play" for the "friend B." Because the menu generating section 144 thus generates the menu items different from each other for the plurality of elements related to the usage purpose, the user A can input the desired usage purpose from various system screens.

The present disclosure has been described above on the basis of embodiments and examples. The embodiments are illustrative, and it is to be understood by those skilled in the art that combinations of constituent elements and processing processes of the embodiments are susceptible of various modifications and that such modifications also fall within the scope of the present disclosure.

What is claimed is:

1. An information processing device comprising:
a receiving section configured to receive an input of a usage purpose of the information processing device from a user;
an identifying section configured to identify a procedure including a complex plurality of steps necessary for realizing the usage purpose, where the complex plurality of steps is unlikely to be known in advance by the user, and includes more than presenting the user with a list of content from which to receive a choice from the user to execute content;
a first screen generating section configured to generate a plurality of operating screens for display on a display device, each of the plurality of operating screens being sequentially displayed to the user for sequentially completing each respective step of the plurality of steps in the identified procedure; and
a second screen generating section configured to generate an information screen for display on the display device, the information screen including information regarding the identified procedure, including a plurality of thumbnail images, where each of the thumbnail images presents the user with a preview of a respective one of the plurality of operating screens thereby informing the user of the plurality of steps required to complete the procedure, wherein:
the plurality of operating screens are positioned within an operating region of the display, and the information screen is positioned within a separate information region of the display,
the operating region includes a graphic user interface (GUI) function that permits the user to provide inputs to the information processing device through the plurality of operating screens, and
the information region does not include the GUI function, such that the user is not permitted to provide inputs to the information processing device through the information screen.

2. The information processing device according to claim 1, wherein the receiving section receives the input of the usage purpose on a basis of an uttered voice of the user.

3. The information processing device according to claim 1, wherein
the identifying section extracts a step in which input of the user is requested from the plurality of steps included in the identified procedure, and
the second screen generating section generates an information screen including information regarding the extracted step.

4. The information processing device according to claim 3, wherein the second screen generating section generates an information screen including information indicating a total number of the plurality of operating screens displayed before realization of the usage purpose.

5. The information processing device according to claim 3, wherein the second screen generating section generates an information screen including information indicating a number of remaining operating screens among the plurality of operating screens to be displayed before realization of the usage purpose.

6. The information processing device according to claim 1, further comprising:
a purpose obtaining section configured to obtain the usage purpose of the information processing device of the user; and
a menu generating section configured to generate a menu item related to the usage purpose obtained by the purpose obtaining section,
wherein when the receiving section receives an operation of selecting the menu item, the identifying section identifies the procedure including the plurality of steps necessary for realizing the usage purpose associated with the menu item.

7. The information processing device according to claim 6, wherein the menu generating section generates menu items different from each other for a plurality of elements included in the usage purpose.

8. The information processing device according to claim 1, wherein when there is a given operating screen among the plurality of operating screens displayed temporally before or after a currently displayed operating screen among the plurality of operating screens, the first screen generating section displays also a part of the given operating screen.

9. The information processing device according to claim 1, wherein when the user performs an input not complying with a procedure on a currently displayed operating screen among the plurality of operating screens after the identifying section identifies the procedure, the identifying section identifies a procedure following the currently displayed operating screen again.

10. A screen generation method in an information processing device, the screen generation method comprising:
receiving an input of a usage purpose of the information processing device from a user;
identifying a procedure including a complex plurality of steps necessary for realizing the usage purpose, where the complex plurality of steps is unlikely to be known in advance by the user, and includes more than presenting the user with a list of content from which to receive a choice from the user to execute content;
generating a plurality of operating screens for display on a display device, each of the plurality of operating screens being sequentially displayed to the user for sequentially completing each respective step of the plurality of steps in the identified procedure; and
generating an information screen for display on the display device, the information screen including information regarding the identified procedure, the information including a plurality of thumbnail images, where each of the thumbnail images presents the user with a preview of a respective one of the plurality of operating screens thereby informing the user of the plurality of steps required to complete the procedure, wherein:
the plurality of operating screens are positioned within an operating region of the display, and the information screen is positioned within a separate information region of the display,
the operating region includes a graphic user interface (GUI) function that permits the user to provide inputs to the information processing device through the plurality of operating screens, and
the information region does not include the GUI function, such that the user is not permitted to provide inputs to the information processing device through the information screen.

11. A non-transitory, computer readable storage medium containing a computer program, which when executed by a computer, causes the computer to carry out actions, comprising:

receiving an input of a usage purpose of the information processing device from a user;

identifying a procedure including a complex plurality of steps necessary for realizing the usage purpose, where the complex plurality of steps is unlikely to be known in advance by the user, and includes more than presenting the user with a list of content from which to receive a choice from the user to execute content;

generating a plurality of operating screens for display on a display device, each of the plurality of operating screens being sequentially displayed to the user for sequentially completing each respective step of the plurality of steps in the identified procedure; and generating an information screen for display on the display device, the information screen including information regarding the identified procedure, the information including a plurality of thumbnail images, where each of the thumbnail images presents the user with a preview of a respective one of the plurality of operating screens thereby informing the user of the plurality of steps required to complete the procedure, wherein:

the plurality of operating screens are positioned within an operating region of the display, and the information screen is positioned within a separate information region of the display, the operating region includes a graphic user interface (GUI) function that permits the user to provide inputs to the information processing device through the plurality of operating screens, and the information region does not include the GUI function, such that the user is not permitted to provide inputs to the information processing device through the information screen.

* * * * *